Aug. 11, 1936.          C. L. EBING          2,050,936
TRACTOR ATTACHMENT
Filed Aug. 28, 1935
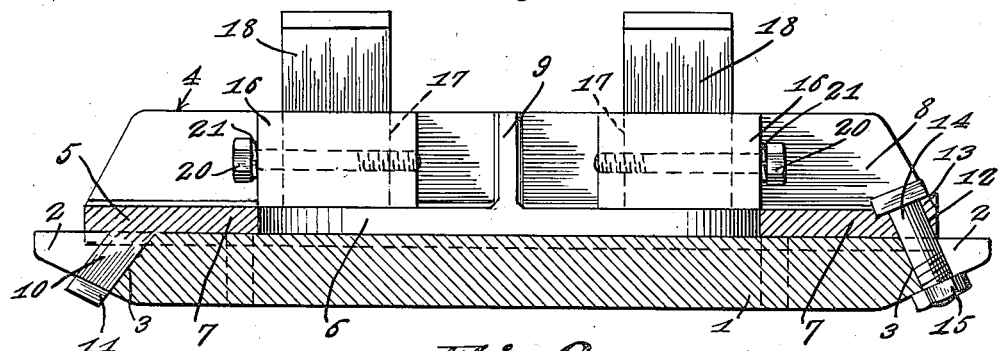
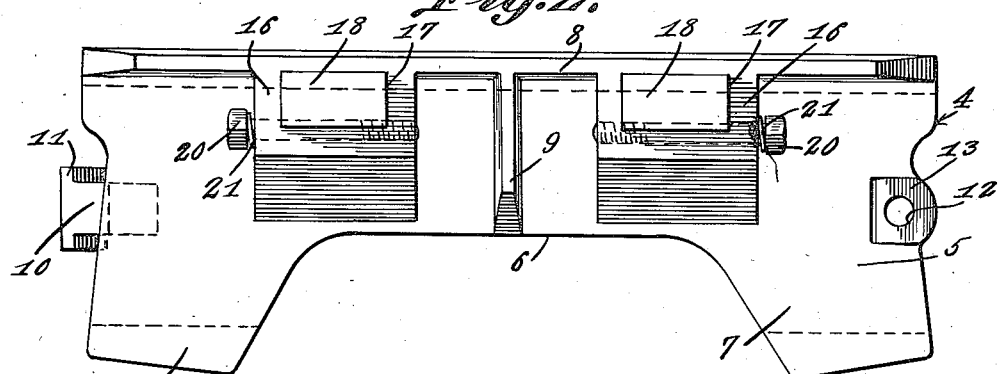
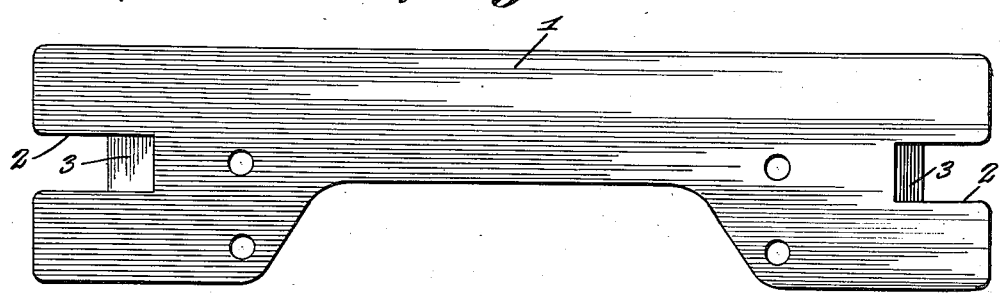
Charles L. Ebing, INVENTOR
BY Victor J. Evans & Co.
ATTORNEY Patented Aug. 11, 1936

2,050,936

UNITED STATES PATENT OFFICE 2,050,936

TRACTOR ATTACHMENT

Charles L. Ebing, Girdwood, Territory of Alaska

Application August 28, 1935, Serial No. 38,273

1 Claim. (Cl. 305—10)

This invention relates to grousers for endless tracks of tractors, and has for the primary object the provision of a readily detachable device of this character which will provide traction calks or grips to meet with certain ground conditions and having means for removably securing thereto traction calks or lugs capable of digging or biting into hard or frozen ground and thereby securing efficient traction on all grades and ground conditions and which may be easily removed when not needed.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a grouser constructed in accordance with my invention and showing the same applied to a tread plate of a tractor track.

Figure 2 is a top plan view illustrating the grouser.

Figure 3 is a plan view illustrating the tread plate.

Figure 4 is an end view illustrating the grouser.

Figure 5 is a perspective view illustrating one of the calks.

Referring in detail to the drawing, the numeral 1 indicates a conventional type of tread plate of a tractor tread wherein the ends are provided with notches 2. The inner walls of the notches are disposed at an inclination, as shown at 3, and said notches open outwardly through the ends of the tread plate.

A grouser 4 is mounted on the tread plate 1 and includes an elongated body 5 having a cutaway portion 6 to define spaced projections 7. At one edge of the body is a flange 8 forming a calk. The flange is integral with the body 5 and arranged at right angles thereto and also integral with the flange and body is a rib 9 cooperating with the flange in defining calks on the tread face of the body.

A lug 10 is formed integrally with the body 5 adjacent one end and extends at an inclination to said body to be received by one of the notches of the tread plate and is provided with flanges 11 to engage under the bifurcated portions defined by said notches. The other end of the grouser or the body 5 thereof is provided with an opening 12 surrounded by a seat 13 to receive a head of a bolt 14 when passed through the opening 12. The bolt extends through the other notch of the tread plate and has turned thereon a nut 15 whereby the grouser is releasably secured to the tread plate.

Upstanding walls 16 are formed integrally with the flange 8 and the body 5 of the grouser to form pockets 17. The pockets 17 removably receive calks 18 which project beyond the flange 8 for biting into the ground. Each calk is grooved, as shown at 19, to receive a bolt or like fastener 20 threaded to walls of the pockets. Lock washers 21 are provided on the bolts for preventing said bolts from working loose. The bolts permit the calks 18 to be applied and removed from the grouser when desired.

Having described the invention, I claim:

A tractor attachment comprising a grouser including a body, a flange integral with one edge of the body and arranged at right angles thereto, a rib integral with the flange and body and extending at right angles to said flange, pockets formed on said body and flange and arranged at opposite sides of the rib, calks received in said pockets and having grooves, and bolts threaded to walls of said pockets and extending into the grooves to releasably secure the calks in the pockets.

CHARLES L. EBING.